United States Patent [19]

Swart et al.

[11] 4,278,787
[45] Jul. 14, 1981

[54] ALTERNATING COPOLYESTERCARBONATE RESINS

[75] Inventors: Daniel J. Swart; Jacqueline S. Kelyman, both of Midland, Mich.

[73] Assignee: The Dow Chemical Company, Midland, Mich.

[21] Appl. No.: 166,283

[22] Filed: Jul. 7, 1980

Related U.S. Application Data

[63] Continuation-in-part of Ser. No. 916,616, Jun. 19, 1978, abandoned, which is a continuation-in-part of Ser. No. 795,978, May 11, 1977, Pat. No. 4,105,633.

[51] Int. Cl.³ .............................................. C08G 63/64
[52] U.S. Cl. .................................... 528/191; 528/127; 528/173; 528/176
[58] Field of Search ............... 528/127, 173, 191, 176; 260/463

[56] References Cited

U.S. PATENT DOCUMENTS

| | | | |
|---|---|---|---|
| 3,030,331 | 4/1962 | Goldberg | 260/42 |
| 3,169,121 | 2/1965 | Goldberg | 260/47 |
| 4,156,069 | 5/1979 | Prevorsek et al. | 528/193 |

Primary Examiner—Theodore E. Pertilla

[57] ABSTRACT

Alternating copolyestercarbonate resins having repeating units of the formula:

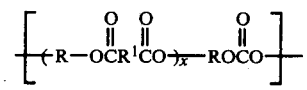

wherein $R^1$ is meta-phenylene and R is independently an aromatic hydrocarbylene or inertly substituted aromatic hydrocarbylene, e.g.,

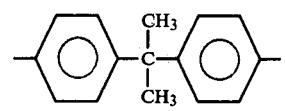

exhibit physical properties such as heat resistance, clarity and impact strength that are superior to the comparable properties of corresponding random copolymers and exhibit physical properties such as impact strength and processability that are superior to the comparable properties of corresponding alternating copolyestercarbonates wherein $R^1$ is para-phenylene. Such resins are useful for making transparent tough films and molded articles having high heat resistance.

4 Claims, No Drawings

ALTERNATING COPOLYESTERCARBONATE RESINS

CROSS-REFERENCE TO RELATED APPLICATION

This application is a continuation-in-part of our copending application Ser. No. 916,616, filed June 19, 1978, abandoned, which is a continuation-in-part of application Ser. No. 795,978, filed May 11, 1977, now U.S. Pat. No. 4,105,633.

BACKGROUND OF THE INVENTION

This invention relates to linear copolyesters that contain both carbonate groups and carboxylate groups in a linear chain.

Polycarbonate resins are known to be tough and rigid and have moderately high softening temperatures. Of particular interest are the polycarbonates of bisphenol-A diols as described in U.S. Pat. No. 3,028,365. On the other hand, polyesters such as those derived from terephthalic acid, isophthalic acid and/or 1,4-butanediol are well known as molding resins having high softening temperatures but poor impact resistances.

In the past, it has been a practice to make random linear copolymers containing ester and carbonate linkages in order to obtain polymers having heat distortion temperatures generally higher than those characteristic of polycarbonates. See, for example, U.S. Pat. Nos. 3,169,121; 3,549,570; 3,053,810; 3,030,331 and 3,220,976. Unfortunately, however, the desired increase in heat distortion is often not as high as needed for many applications. More importantly, any increase in heat distortion is achieved only by sacrificing almost all of the high impact resistance that is characteristic of polycarbonate resins.

In view of the aforementioned deficiencies of conventional polyesters, polycarbonates and copolymers thereof, it would be highly desirable to provide a polymer of the same or similar monomeric materials wherein improved heat resistance is obtained without almost total sacrifice of impact resistance.

SUMMARY OF THE INVENTION

Accordingly, the present invention is such a polymer. This polymer is a normally solid alternating copolyestercarbonate containing repeating units having the formula:

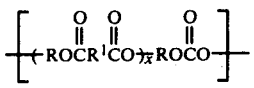

wherein each R is independently aromatic hydrocarbylene or inertly substituted aromatic hydrocarbylene, $R^1$ is meta-phenylene or inertly substituted meta-phenylene, and x is a number from 0.05 to 10. For the purposes of this invention, an "inertly substituted" group is one having one or more substituents which are inert in the condensation reaction used to prepare the copolymer. "Hydrocarbylene" is a predominantly hydrocarbon divalent radical including aliphatic and/or aromatic hydrocarbon diradicals as well as hydrocarbon radicals linked together by

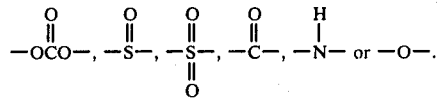

This alternating copolymer is advantageously prepared by first reacting an excess of a dihydric hydrocarbylene with an isophthaloyl halide and then reacting the resulting dihydroxyester product with phosgene or a similar compound capable of forming carbonate linkages with diols. The first reaction is advantageously carried out in the presence of a hydrogen chloride acceptor such as pyridine. The second reaction is typically effected using conditions common to the reaction of phosgene with simple diols to form polycarbonates. This two-step reaction to prepare the alternating copolymer can be represented by the following:

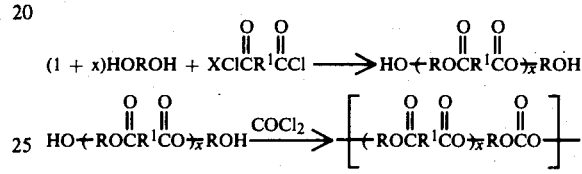

wherein R, $R^1$ and x are as defined hereinbefore.

While the alternating copolymers of this invention are similar in many respects to their corresponding random copolymers, they exhibit heat resistance, clarity, solubility and strength that are unexpectedly higher than those of the random copolymers. Even more surprising is that such alternating polymers prepared from an isophthaloyl halide exhibit higher impact strengths and improved processability compared to similar alternating polymers prepared from terephthaloyl chloride. Accordingly, the alternating copolymers of this invention, particularly the resinous ones, are useful in most applications in which polycarbonates, polyesters and copolymers thereof are conventionally employed. In particular, such alternating copolymers are useful for making transparent tough films and molded articles having high heat resistance. In addition, such alternating copolymers may be blended with other polymers such as ABS resins, styrene/acrylonitrile copolymers and impact polystyrenes to provide molding blends and/or they may be combined with reinforcing fibers such as glass fibers.

DETAILED DESCRIPTION OF ILLUSTRATIVE EMBODIMENTS

The dihydric hydrocarbylene employed in preparing the copolymers of this invention is suitably any predominantly hydrocarbon compound containing at least two alcoholic hydroxyl groups wherein alcoholic hydroxyl includes phenolic hydroxyl. Included within the dihydric hydrocarbylenes are aliphatic diols including glycols and cycloaliphatic diols, aromatic diols, including alkaryl diols, dihydric phenols and aromatic diols having heterocyclic groups such as phenolphthalein. Of the dihydric hydrocarbylenes, the dihydric phenols are preferred.

The dihydric phenols preferably used in preparing the alternating copolymers of the present invention are suitably any aromatic compound having an aromatic hydrocarbylene group to which is aromatically bonded two hydroxyl groups. Most advantageously, the dihydric phenols are those aromatic diols represented by the formula:

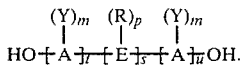

In the formula, A is an aromatic group such as phenylene, biphenylene, naphthenylene, anthracenylene and the like. E is alkylene or alkylidene such as methylene, ethylene, ethylidene, propylene, propylidene, isopropylidene, butylene, butylidene, isobutylidene, amylene, isoamylene, amylidene, and isoamylidene or E may be cycloalkylene such as cyclopentylene, cyclohexylene; a sulfur-containing linkage such as sulfide, sulfoxide or sulfone, an ether linkage; a carbonyl group; a tertiary nitrogen group or a silicone-containing linkage such as silane or siloxy. R is hydrogen or a monovalent hydrocarbon group such as alkyl, aryl, arylalkyl or cycloaliphatic; Y is chlorine, bromine, fluorine or R wherein R is defined above. The letter m is any whole number from and including zero through the number of positions on A available for substitution; p is any whole number from and including zero through the number of available positions on E; t is a whole number equal to at least one; s is either zero or one and u is any whole number including zero. Examples of such dihydric phenols include 2,2-bis-(4-hydroxyphenyl)propane [bisphenol-A]; bis-(4-hydroxyphenyl)methane; 1,1-bis-(4-hydroxyphenyl)ethane and others including dihydroxy aromatic ethers listed in U.S. Pat. No. 3,169,121 at Column 2, line 60 through Column 3, line 55.

Also included among the suitable dihydric phenols are those having an ar,ar'-dihydroxytrityl nucleus represented by the formula:

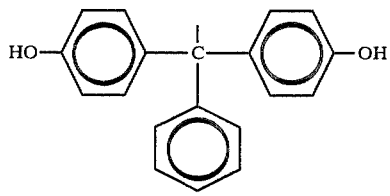

wherein the aromatic rings bear, in addition to the hydroxy substituents, such substituents as H, F, Cl, Br, I, —NO₂, —O—, alkyl, acyl, carboxylate ester, sulfonate ester and the like. Representative diols containing the ar,ar'-dihydroxytrityl nucleus include phenolphthalein nucleus compounds as described in U.S. Pat. No. 3,036,036; phenolsulfonephthalein nucleus compounds described in U.S. Pat. No. 3,036,037; phthalidene nucleus compounds as described in U.S. Pat. No. 3,036,038; fluorescein nucleus compounds as described in U.S. Pat. No. 3,036,039 and phenolphthalimidene nucleus compounds corresponding to the phenolphthalein nucleus compounds described in U.S. Pat. No. 3,036,036; all of which patents are hereby incorporated by reference. Of the aforementioned dihydric phenols, the bis(ar-hydroxyphenyl)alkylidenes, particularly bisphenol-A, and phenolphthalein are preferred, with bisphenol-A being most preferred.

In the preparation of the alternating copolymers of this invention, any isophthaloyl halide is suitably employed. Most preferably, however, the isophthaloyl halide is isophthaloyl chloride, with isophthaloyl bromide and isophthaloyl iodide being suitable but less preferred than the chloride. Suitable alternatives to the isophthaloyl halide include inertly substituted derivatives of isophthaloyl halide wherein an inert substituent is halo, hydrocarbyl such as alkyl or aryl, halohydrocarbyl and the like. The isophthaloyl halides are prepared by reacting the desired isophthalic acid with thionyl chloride or other thionyl halide in aromatic solvent, e.g., under conditions described in *High Polymers*, Vol. XXVII, "Condensation Monomers," J. K. Stille and T. W. Campbell, editors, pages 509–514, Wiley-Interscience, 1972. Exemplary diacids include isophthalic acid and halo derivatives thereof.

The alternating copolymers are advantageously prepared by a two-step process wherein an excess of the dihydric hydrocarbylene is first reacted with the isophthaloyl halide in the presence of a hydrogen chloride acceptor such as pyridine. The dihydroxyester intermediate produced by this reaction is then reacted with phosgene or other agent which will suitably form the desired carbonate linkages. Both steps of the process are normally carried out under an inert atmosphere such as nitrogen with the reactants dissolved in one or more solvent such that the reactants are totally miscible. While the concentrations of the reactants in the solvents are not particularly critical, the concentration of dihydric hydrocarbylene is preferably from about 2 to about 10 weight percent and the concentration of the isophthaloyl halide is preferably from about 1 to about 5 weight percent based on the total weight of monomers and solvents. In the second step of the reaction, the concentration of ester intermediate is preferably from about 3 to about 15 weight percent based on total weight of ester intermediate and solvents. It is preferred that the solutions of the various reactants be totally miscible in each other. It is sufficient, however, if such solutions are partially miscible, i.e., at least 10 weight percent. Examples of suitable solvents include chlorinated aliphatic hydrocarbons such as methylene chloride, chloroform, sym-tetrachloroethane, 1,1,2-trichloroethane and cis-1,2-dichloroethylene.

The molar ratio of dihydric hydrocarbylene to isophthaloyl halide varies proportionately with the ester:carbonate ratio desired in the alternating copolymer. Generally, the molar ratio of dihydric hydrocarbylene to isophthaloyl halide is advantageously from about 21:1 to about 1.1:1, preferably from about 21:1 to about 1.3:1. The molar ratio of dihydroxyester intermediate to phosgene is advantageously from about 1:1 to about 1:1.2, preferably about 1:1.01 to about 1:1.08.

While pyridine is the preferred hydrogen chloride acceptor employed in the first step of this process, other suitable acceptors include other amine bases such as triethylamine, N,N-dimethylaniline and N,N-dimethylcyclohexylamine. Such acceptors are advantageously employed in amounts sufficient to complex the hydrogen chloride liberated and to catalyze both steps of the process.

Since higher concentrations of the acceptor produce higher molecular weight copolymers, actual concentrations of acceptor will vary depending upon the molecular weight desired. Moreover, at constant terminator levels, higher monomer concentrations produce higher molecular weight copolymers. Therefore, the concentrations of monomers vary depending upon the molecular weight desired. Preferably, in order to prepare copolymers having weight average molecular weights (Mw) from 25,000 to 60,000, the acceptor is employed in amounts from about 100 to about 160 mole percent based on moles of hydroxyl moiety in the monomers, most preferably from about 120 to about 140 mole percent. At such acceptor concentrations, the concentrations of monomers are preferably in the range from about 3 to about 15 weight percent, most preferably from about 5 to about 12 weight percent.

In carrying out the two-step process, the dihydric hydrocarbylene and isophthaloyl halide are combined in any manner, preferably by adding the isophthaloyl halide either neat or dissolved in a suitable solvent with stirring to a solution of the dihydric hydrocarbylene and hydrogen chloride acceptor. While stirring rate is not critical, a stirring rate of about 50 to about 500 rpm, most preferably from about 150 to 300 rpm, is maintained. While reaction temperature is not critical, the reaction temperature of the first step is preferably maintained in the range from about 10° to about 35° C., most preferably from about 19° to about 25° C. Reaction pressures are similarly not critical, however, atmospheric to superatmospheric pressures are normally employed as a matter of convenience. The ester intermediate is normally formed under these conditions in about 1 to about 10 minutes after addition of the isophthaloyl halide. While the ester intermediate may be recovered and purified before proceeding to the second step of the process, it is generally not desirable to do so.

Accordingly, the aforementioned reaction mixture containing the ester intermediate is converted to the desired copolymer by bubbling phosgene or other suitable carbonate forming reactant into the reaction mixture. Advantageously, the reaction mixture contains an amount of a monohydric phenol or other suitable chain terminator to effect desired control of the molecular weight of the resulting copolymer. While the amount of chain terminator employed varies with the efficacy of the terminator and the molecular weight desired, beneficial amounts of terminator are normally in the range from about 1 to about 10 mole percent based on ester intermediate, preferably from about 2 to about 7 mole percent. Although not critical, the reaction temperature of the second step is preferably maintained in the range from about 10° to about 35° C., most preferably from about 20° to about 27° C. As in the first step, reaction pressures are normally atmospheric to superatmospheric as a matter of convenience. The alternating copolymer is normally formed under these conditions in about 1 to about 10 minutes after phosgene addition.

In both steps of the foregoing process, the reaction mixture is agitated sufficiently to effect intimate contact of the reactants and desired heat transfer throughout the reaction medium. Following completion of the second step of the process, the desired alternating copolymer is readily recovered from the reaction medium by conventional techniques as exemplified in the following examples. Due to the ease of preparation and less expensive starting materials, the alternating copolymers derived from bisphenol-A and isophthaloyl chloride are preferred.

The alternating copolymers of this invention are more advantageously represented by the formula:

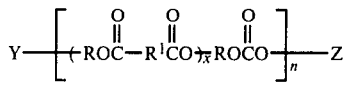

wherein Y and Z are independently terminating groups common to polyesters or polycarbonates; R, R¹, and x are as defined hereinbefore and n is a whole number from about 5 to about 300. Illustratively, Y is

wherein R² is hydrocarbyl such as alkyl, aryl or aralkyl; and R and R¹ are as defined hereinbefore. Representative Z includes

wherein R² and R are as defined hereinbefore.

The alternating copolymers having repeating units are most advantageously represented by the formula:

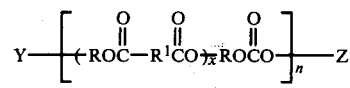

wherein Y is —OH or

Z is —R² or —ROH; x is 0.05 to 10, preferably 0.05 to 3; and R, R¹, R² and n are as defined hereinbefore. Preferred alternating copolymers are those represented by the foregoing formula wherein Y is

Z is —R²; R² is hydrocarbyl, e.g., alkyl, aryl, alkaryl, cycloalkyl or aralkyl; and n is a whole number from about 5 to about 300, preferably from about 10 to about 200 and most preferably from about 30 to about 100. For purposes of this invention, hydrocarbyl is a monovalent hydrocarbon radical. In the most preferred alternating copolymers Y is

Z is —R²; R² is

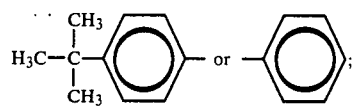

R is

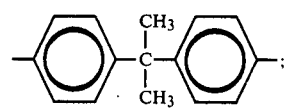

and R¹ is

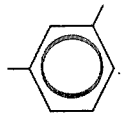

While the molecular weight of the alternating copolymers of this invention is not particularly critical, those having weight average molecular weight (Mw, determined by gel permeation chromatography using a bisphenol-A polycarbonate calibration curve) greater than 20,000 are of more significance. It is found that those copolymers of relatively high molecular weight, e.g., those having a Mw of at least about 25,000 up to and including those having a Mw of about 60,000, are found to exhibit the properties and physical characteristics most desirable of molding resins. Most preferred for this purpose are those copolymers having a Mw in the range from about 25,000 to about 40,000 and Mw/Mn (number average molecular weight) from about 1.5 to about 5.

The following examples are given to illustrate the invention and should not be construed as limiting its scope. Unless otherwise indicated, all parts and percentages are by weight.

EXAMPLE 1

Preparation of the Alternating Copolymers

In step one of a two-step process, a 12-l (liter) flask is charged with 751.0 g (3.29 mol) of bisphenol-A, 7.938 l methylene chloride and 676.6 g (8.554 mol) pyridine. Stirring is begun and when a clear solution of bisphenol-A is obtained, 333.93 g (1.645 mol) isophthaloyl chloride is added continuously over a period of 7 minutes while continuously stirring the contents of the flask at 19°–25° C. and 250 rpm. The clear reaction solution is stirred an additional 10 minutes following isophthaloyl chloride addition before the second step of the process is begun.

In step two, the aforementioned reaction solution containing the ester intermediate is combined with 12.35 g (0.082 mol) p-tert-butylphenol (as chain terminator). The resulting solution is stirred at 175 rpm and 175.7 g (1.584 mol) phosgene is added over a period of 56 minutes by bubbling the phosgene into the liquid reaction solution at 22°–25° C.

The resulting polymeric product is recovered from the reaction mixture by the following procedure: 1.5 l of 3.0 N HCl is added to neutralize excess pyridine. Following phase separation, the methylene chloride solution of polymer is washed consecutively with 1 l of 0.5 N HCl and 1 l of water, with phase separation after each washing. Following the final washing, the methylene chloride solution of polymer is passed through a column packed with a cation exchange resin (sulfonic acid type, bed volume of 500–600 ml), giving a clear, almost water-white solution. The polymeric product is isolated by the slow addition of 1 volume of methylene chloride solution to 5 volumes of hexane with rapid stirring. The resulting white fibers are isolated by filtration, dried in air for 24 hours and then dried in vacuo 48 hours at 120° C. to yield 900.1 g (89.3 percent of theory) having an inherent viscosity of about 0.51 dl/g (measured in methylene chloride at 25° C., 0.5 g/dl).

Analysis of the polymer by IR, NMR and elemental analysis indicates that it is an alternating copolymer represented by the structural formula:

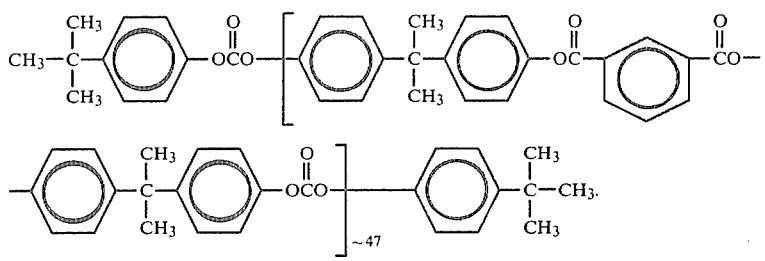

The copolymer repeating unit has an ester:carbonate ratio of 2:1. Compression molded test bars (thickness of 0.32 cm, molded at 300° C.) of this alternating copolymer (Sample No. 1) are tested for physical properties and the results are reported in Table I.

For purposes of comparison, a random copolymer of about the same molecular weight and with an ester:carbonate ratio of 2:1 is prepared by phosgenating a mixture of bisphenol-A and isophthalic acid, as described in U.S. Pat. No. 3,169,121 (see Examples 3, 10 and 11). The recovered random copolymer has an inherent viscosity of about 0.51 dl/g (measured in $CH_2Cl_2$ at 25° C., 0.5 g/dl). Compression molded test bars (thickness of 0.32 cm, molded at 300° C.) of this copolymer (Sample No. A) are also tested for physical properties and the results are reported in Table I.

TABLE I

| | Sample No. | |
|---|---|---|
| | 1 | A* |
| Copolymer type | Alternating | Random |
| Inherent viscosity[1], dl/g | 0.51 | 0.51 |
| Vicat softening[2], °C. | 180 | 164 |
| Izod Impact[3], ft-lb/in, notched | 10.18 | 6.63 |
| Transmission[4], % | 85.3 | 71.3 |
| Haze[4], % | 4.1 | 80.1 |
| Yellowness Index[5] | 13.2 | 21.8 |

*Not an example of the invention.
[1]Measured in $CH_2Cl_2$ at 25° C., 0.5 g/dl.
[2]ASTM D-1525.
[3]ASTM D-256.
[4]ASTM D-1003.
[5]ASTM D-1925.

As evidenced by the data in Table I, the alternating copolymer exhibits heat resistance, impact resistance and clarity that are superior to those properties in the random copolymer.

EXAMPLE 2

Following the general procedure of Example 1, copolymers are prepared using bisphenol-A, isophthaloyl chloride and phosgene with ester:carbonate molar ratios of 2:1 (Sample No. 2) and 3:1 (Sample No. 3). For comparison, copolymers are prepared using bisphenol-A, terephthaloyl chloride and phosgene with ester:carbonate ratios of 2:1 (Sample No. B) and 3:1 (Sample No. C). These samples are injection molded using a Newbury H1 30RS machine equipped with a Control Pressure, Inc. Process Sentry Model 750 and Process Recorder. The following molding conditions are used: barrel zones-316° C., nozzle-304° C., mold halves-121° C., injection time-10 seconds, total cycle time-45 seconds, feed setting-2.5, tensile bar and runner limits-2,000 psi and single stage injection mode. To compare processability, the injection pressure required to obtain a pressure of 4,000 psi at the end of the molded tensile bar is determined. The physical properties and processability results for the resulting 0.32 cm thick injection molded specimens are shown in Table II.

TABLE II

| | Sample No. | | | |
|---|---|---|---|---|
| | 2 | B* | 3 | C* |
| Aromatic diol (1) | BA | BA | BA | BA |
| Diacid chloride (2) | IPC | TPC | IPC | TPC |
| E:C (3) | 2:1 | 2:1 | 3:1 | 3:1 |
| Inherent viscosity (4), dl/g | 0.55 | 0.50 | 0.51 | 0.53 |
| $M_w$ (5) | 55,802 | 55,162 | 51,918 | 50,610 |
| Vicat softening (6), °C. | 180 | 197 | 182 | 203 |
| Izod impact (7), ft-lb/in, notched | 10.25 | 5.96 | 9.52 | 4.99 |
| Injection pressure (8), psi | 8,000 | 16,000 | 11,750 | 21,125 |
| Tensile at yield (9), psi | 9,338 | 9,012 | 9,314 | 9,061 |
| Tensile at break (9), psi | 7,783 | 8,480 | 7,530 | 8,721 |
| Elongation at yield (9), % | 7.06 | 8.47 | 6.83 | 8.94 |
| Elongation at break (9), % | 53.8 | 34.5 | 48.8 | 38.8 |
| Tensile modulus (9), psi | 295,00 | 308,000 | 299,000 | 297,000 |
| Transmission (10), % | 87.1 | 84.5 | 86.6 | 87.4 |
| Haze (10), % | 4.3 | 4.5 | 2.9 | 3.0 |
| Yellowness index (11) | 8.4 | 10.3 | 15.7 | 15.3 |

*Not an example of the invention.
(1) BA = bisphenol-A.
(2) IPC = isophthaloyl chloride TPC = terephthaloyl chloride.
(3) Mole ratio of ester:carbonate in copolymer.
(4) Measured in $CH_2Cl_2$ at 25° C., 0.5 g/dl.
(5) Weight average molecular weight, determined by gel permeation chromatography using polystyrene calibration.
(6) ASTM D-1525.
(7) ASTM D-256.
(8) Pressure required to obtain 4,000 psi at end of tensile bar.
(9) ASTM D-638.
(10) ASTM D-1003.
(11) ASTM D-1925.

As evidenced by the data set forth in Table II, the alternating isophthalate copolymers have physical properties, particularly impact strength and processability, which are generally superior to the same properties of the alternating terephthalate copolymers.

EXAMPLE 3

Following the general procedure of Example 1, other copolymers are prepared using isophthaloyl chloride and aromatic diols as specified in Table III. These copolymers have ester:carbonate ratios of 0.11:1 (Sample No. 4), 0.67:1 (Sample No. 5), 1:1 (Sample No. 6), 2:1 (Sample No. 7), 4:1 (Sample No. 8) and 6:1 (Sample No. 9). These copolymers are compression molded or injection molded and tested for physical properties as recorded in Table III.

TABLE III

| | Sample No. | | | | | |
|---|---|---|---|---|---|---|
| | 4 | 5 | 6 | 7 | 8 | 9 |
| Aromatic diol (1) | BA | BA | BA | BA/PP(a) | BA | BA |
| E:C (2) | 0.11:1 | 0.67:1 | 1:1 | 2:1 | 4:1 | 6:1 |
| Inherent viscosity (3), dl/g | 0.47 | 0.47 | 0.51 | 0.45 | 0.48 | 0.59 |
| Type molding (4) | I | I | I | C | I | I |
| Vicat softening (5), °C. | 158 | 169 | 171 | 225 | 184 | 187 |
| Izod impact (6), ft-lb/in, notched | 14.85 | 12.31 | 12.08 | 3.01 | 9.08 | 8.28 |
| Tensile at yield (7), psi | 8,921 | 9,123 | 9,135 | Not Measured | 9,500 | 9,573 |
| Tensile at break (7), psi | 8,309 | 8,289 | 7,622 | Not Measured | 8,331 | 7,931 |
| Elongation at yield (7), % | 6.14 | 6.57 | 6.88 | Not Measured | 7.60 | 7.0 |
| Elongation at break (7), % | 101.7 | 55.0 | 67.5 | Not Measured | 32.6 | 38.9 |
| Tensile modulus (7), psi | 336,000 | 320,000 | 307,000 | Not Measured | 313,000 | 302,000 |
| Transmission (8), % | 88.1 | 87.2 | 85.2 | Not Measured | 85.1 | 69.0 |
| Haze (8), % | 2.3 | 3.0 | 3.9 | Not Measured | 2.7 | 5.6 |
| Yellowness index (9) | 5.9 | 6.3 | 11.8 | Not Measured | 30.7 | 45.9 |

(1) BA = bisphenol-A, PP = phenolphthalein
(a) = aromatic diol feed contains 1 mole of BA per 1 mole of PP.
(2) Mole ratio of ester:carbonate in copolymer.
(3) Measured in $CH_2Cl_2$ at 25° C., 0.5 g/dl.
(4) I = injection, C = compression.
(5) ASTM D-1525.
(6) ASTM D-256.
(7) ASTM D-638.
(8) ASTM D-1003.
(9) ASTM D-1925.

What is claimed is:

1. A normally solid alternating copolyester-carbonate having repeating units of the formula:

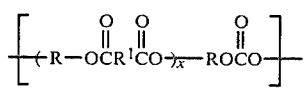

wherein each R is independently an aromatic hydrocarbylene or inertly substituted hydrocarbylene, $R^1$ is meta-phenylene or inertly substituted meta-phenylene and x is a number from 0.05 to 10.

2. The copolyestercarbonate of claim 1 represented by the formula:

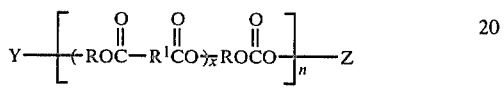

wherein each R is independently aromatic hydrocarbylene or inertly substituted aromatic hydrocarbylene, $R^1$ is meta-phenylene; Y is —OH or

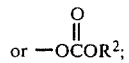

$Z$ is $-R^2$ or $-ROH$; $R^2$ is hydrocarbyl; x is a number from 0.05 to 10 and n is a whole number from about 5 to about 300.

3. The copolyestercarbonate of claim 2 wherein each R is

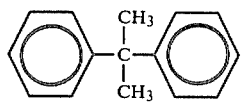

and each $R^1$ is

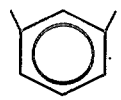

4. The copolyestercarbonate of claim 3 wherein x is 0.05 to 3 and n is a whole number from about 30 to about 100.

* * * * *